United States Patent
Benveniste

(10) Patent No.: US 7,688,724 B2
(45) Date of Patent: Mar. 30, 2010

(54) CALL ADMISSION CONTROL FOR MOBILITY-CAPABLE TELECOMMUNICATIONS TERMINALS

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1031 days.

(21) Appl. No.: 11/317,514

(22) Filed: Dec. 23, 2005

(65) Prior Publication Data

US 2007/0147240 A1 Jun. 28, 2007

(51) Int. Cl.
H04J 1/16 (2006.01)
H04L 12/26 (2006.01)
(52) U.S. Cl. .................................................. 370/230
(58) Field of Classification Search ................. None
See application file for complete search history.

(56) References Cited

U.S. PATENT DOCUMENTS

| | | | | |
|---|---|---|---|---|
| 5,179,549 | A * | 1/1993 | Joos et al. | 370/232 |
| 6,084,955 | A | 7/2000 | Key et al. | |
| 6,418,136 | B1 * | 7/2002 | Naor et al. | 370/347 |
| 6,519,705 | B1 * | 2/2003 | Leung | 713/300 |
| 6,683,852 | B2 | 1/2004 | Nagarajan et al. | |
| 2005/0052996 | A1 | 3/2005 | Houck et al. | |
| 2005/0220019 | A1 | 10/2005 | Melpignano | |
| 2008/0069079 | A1 * | 3/2008 | Jacobs | 370/348 |

FOREIGN PATENT DOCUMENTS

| | | |
|---|---|---|
| EP | 1 244 318 A1 | 9/2002 |
| WO | 2004/004249 A1 | 1/2004 |

OTHER PUBLICATIONS

Rahin et al, "Call Admission Control Algorithms in ATM Network: Performance Comparison and Research Directions", Interim Research Report Draft, Sep. 29, 1998, XP002261448, Sections 1-4.
PCT, "International Preliminary Report on Patentability" and amendments, Apr. 24, 2008, Publisher: PCT.
Gavin Alarcon, Oscar, "PCT Application No. PCT/US2006/061931 International Search Report Aug. 17, 2007",, Publisher: EPO, Published in: PCT.

* cited by examiner

Primary Examiner—Raj Jain
(74) Attorney, Agent, or Firm—DeMont & Breyer, LLC

(57) ABSTRACT

As is reflected in the disclosed method and apparatus, the present invention is a technique to account for the variation in channel occupancy of a particular terminal or terminals during the call admission process. Instead, a channel utilization manager accounts for the probabilistic nature of the call admission decision by using a pre-determined, statistically justified value to represent the channel occupancy. The "per-call" channel occupancy value is determined by a number of factors, including the shared-communications channel data rate. Channel occupancy is incorporated into one or more cumulative distribution functions (CDF), which are evaluated by the channel utilization manager as part of the call admission process. In turn, each channel-occupancy CDF of a shared-communications channel can be generated from a CDF of the terminals' data rates on that channel, which data rates can be determined analytically or empirically.

8 Claims, 9 Drawing Sheets

CALL ADMISSION CONTROL FOR MOBILITY-CAPABLE TELECOMMUNICATIONS TERMINALS

REFERENCE TO RELATED APPLICATIONS

This application incorporates by reference the following applications:
i. U.S. patent application Ser. No. 11/318,162, filed on 23 Dec. 2005, entitled "Call Admission Control of Shared-Access Resources through a Call-Handling Server"; and
ii. U.S. patent application Ser. No 11/318,168, filed on 23 Dec. 2005, entitled "Call Admission Control of a Shared-Access Resource during a Handover."

FIELD OF THE INVENTION

The present invention relates to telecommunications in general, and, more particularly, to admitting a call in a shared-access system.

BACKGROUND OF THE INVENTION

FIG. 1 depicts a diagram of telecommunications system 100 in the prior art. Telecommunications system 100 comprises wireless telecommunications terminals 101 and 102; access points 103-1 through 103-M that serve basic service areas 110-1 through 110-M, respectively, wherein M is a positive integer; server 105; telecommunications terminal 106; and telecommunications network 100, interconnected as shown.

Telecommunications system 100 is capable of Session Initiation Protocol (or "SIP") signaling. SIP is a standard protocol for initiating an interactive user session (i.e., a "call") that involves multimedia elements such as voice, chat, video, and so forth.

Basic service area 110-m, for m=1 through M, is the service area in which shared access of other nodes in telecommunications system 100 is provided to telecommunications terminals such as terminals 101 and 102 As depicted in FIG. 1, basic service area 110-m is in an IEEE 802.11 wireless local area network. In area 110-m, the one or more wireless telecommunications terminals that make up the basic service set of area 110-m are able to access other nodes in system 100 via a shared-communications channel supported by access point 103-m.

Telecommunications network 100 is a telecommunications network such as the Internet, the Public Switched Telephone Network (PSTN), and so forth. Network 100 comprises or is connected to one or more transmission-related nodes such as gateways, routers, or switches that are used to direct packets from one or more sources to the correct destinations of those packets.

The service provided by the path that links a first node with a second node is characterized by its "quality of service," which, for the purposes of this specification, is defined as a function of the bandwidth, error rate, and latency from one node to another. For example, a shared-communications channel that links a wireless terminal such as terminal 101 with an access point such as access point 103-1 is subject to a quality-of-service level.

For the purposes of this specification, the "bandwidth" from one node to another is defined as an indication of the amount of information per unit time that can be transported from the first node to the second. Typically, bandwidth is measured in bits or bytes per second. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another. Typically, latency is measured in seconds.

Each of telecommunications terminals 101 and 102, as well as terminal 106, is a communications device such as a local area network telephone, a notebook computer, a personal digital assistant [PDA], a tablet PC, and so forth. Each telecommunications terminal has an associated contact identifier (e.g., telephone number, email address, Internet Protocol address, etc.) that uniquely identifies that terminal in the address space of telecommunications system 100. Terminals 101 and 102 communicate, through one or more access points 103-1 through 103-M, with other telecommunications terminals that have connectivity with network 100, such as terminal 106. For example, terminal 101 is presently associated with access point 103-1 as depicted in FIG. 1 and uses the corresponding shared-communications channel to communicate wirelessly with other devices. In order to communicate, a user at a first telecommunications terminal in system 100, such as terminal 101, places a "call" (e.g., voice call, email, text chat, video, etc.) to a user at a second terminal in system 100, such as terminal 106. Terminals 101 and 102 are also capable of communicating with each other with call control signaling being routed through one or more nodes connected to network 100, as described below.

Each telecommunications terminal may use a "codec," as is known in the art, to more efficiently transmit user information, such as voice signals, by compressing the transmitted information and decompressing the received information. A codec has an associated "codec rate" that specifies how much (compressed) information actually has to be transmitted per unit time.

Server 105 is a Session Initiation Protocol (SIP) proxy server that interacts with other nodes in setting up and managing calls. For example, server 105 is able to receive a call setup message (a SIP INVITE message) from terminal 101 as the result of terminal 101's user initiating a call attempt. The message is accompanied by (i) a traffic stream description (e.g., a SIP Real-Time Protocol [RTP] payload type, etc.) that specifies the nature of the call and (ii) the user identifier of the person being called.

System 100 has to be able to determine whether to admit each call. Call admission control is necessary, considering that terminal 101 is also competing with other terminals in its basic service area (i.e., area 101-1) for the shared-communications channel provided by access point 103-1. In fact, each of access points 103-1 through 103-M has to be able to handle multiple traffic streams—each stream comprising a series of packets—that are transmitted to or from wireless terminals via the corresponding shared-communications channel.

Furthermore, some of the terminals are capable of mobility. As a mobility-capable terminal moves closer to or away from an access point (e.g., access point 103-1, etc.), the maximum data rate at which the terminal is able to communicate with the access point changes during a call. When the terminal is close to the access point, the signal is generally stronger and, as a result, the maximum data rate is higher. Likewise, when the terminal is far from the access point, the signal is generally weaker and, as a result, the maximum data rate is lower. As a result, the actual shared-communications channel bandwidth that the terminal utilizes—that is, the channel occupancy used by the terminal-during a call changes over time. Furthermore, there can be multiple terminals using the shared-communications channel for calls, where each terminal is able to move independently of one another during a call.

SUMMARY OF THE INVENTION

It is problematic to consider the variation in channel occupancy that is due to the movement of a telecommunications terminal with respect to its associated access point. This is because the actual variation in the terminal's movement during a call as a function of time typically cannot be predicted. Yet it is important, as part of determining whether to admit a call on a shared-communications channel, to account for the channel occupancy contributed by the terminal in relation to the available bandwidth of the channel, especially considering that many other terminals might already be using the shared-communications channel.

The present invention is a technique to account for the variation in channel occupancy of a particular terminal or terminals during the call admission process. In accordance with the illustrative embodiment of the present invention, a channel utilization manager accounts for the probabilistic nature of the call admission decision by using a pre-determined, statistically justified value to represent the channel occupancy. The "per-call" channel occupancy value is determined by a number of factors, including the shared-communications channel data rate. The per-call channel occupancy for a given codec and shared-communications channel data rate is determined through empirical observation or through simulation models, and is used in the manner described below.

In accordance with the illustrative embodiment, channel occupancy is incorporated into one or more cumulative distribution functions (CDF) of channel occupancy. For a given shared-communications channel, each channel occupancy CDF represents the probability of a given channel occupancy level, while taking into account the number of calls (e.g., 1 call, 2 calls, etc.) and other parameters that include (i) the variability in the maximum data rates of the terminals present, and (ii) the application of different data-transmission requirements (e.g., codec rate, etc.) to each of those terminals when on a call.

When the channel utilization manager considers admitting a candidate call and that call would be the Nth concurrent call on the shared-communications channel, the manager evaluates channel occupancy by using the N-call CDF for the mix of codecs employed by the established calls and the new call. The evaluation determines whether the resulting channel occupancy would be less than or equal to an adjustable bandwidth threshold (e.g., 80 percent of the channel's limit, etc.), at a probability that exceeds confidence level (e.g., 98%, etc.). If this admission criterion is met, the channel utilization manager admits the call, in accordance with the illustrative embodiment of the present invention.

In a single-codec operational scenario in which a single codec is used by all of the calls on a channel, the call admission process reduces to determining the maximum number of calls, using that codec, that results in the total channel occupancy not exceeding the quantile value of channel occupancy that corresponds to the desired confidence probability level. From that point on, the maximum number of calls, $N_{MAX}$, represents the call capacity of the channel. A candidate call will be admitted if the number of existing calls is less than $N_{MAX}$.

In some embodiments of the present invention, each channel-occupancy CDF of a shared-communications channel is generated from a CDF of the terminals' data rates on that channel. A probability distribution of the terminals' data rates is generated from an analytical model or from input received from an access point, or both. Estimating data rate probability distribution provides an efficient way to derive a channel occupancy probability distribution for a variety of combinations of codec type and number of calls.

In some other embodiments, the channel utilization manager is able to refine the channel occupancy values during the processing of live calls on a shared-communications channel. The access point that supports the channel regularly reports to the manager the data rate supported by a terminal, for multiple terminals. An empirically derived probability distribution, as such, reflects both the propagation environment and the spatial distribution of the terminals that are involved in calls in the basic service area. Thus, the probability distribution and call admission criterion are tailored to the particular basic service area that is monitored and supported by the access point.

Although the utilization management in the illustrative embodiment is applied to the managing of a shared-communications channel, the present invention can be applied to managing other types of resources that are shared by users, as those who are skilled in the art will appreciate.

The illustrative embodiment of the present invention comprises: receiving: (i) a data-transmission requirement for a call that involves a first telecommunications terminal, and (ii) an indication that the first telecommunications terminal is monitoring a shared-communications channel; and determining whether to admit the call on the shared-communications channel, based on a probability that the channel occupancy of the shared-communications channel, as the result of admitting the call, will not exceed the available capacity being greater than a threshold value, wherein the shared-communications channel is already carrying (N−1) calls, and wherein the probability is conditional on the value of N.

DETAILED DESCRIPTION

The following terms are defined for use in this Specification, including the appended claims:

The term "data-transmission requirement," and its inflected forms, is defined as a requirement for the proper transmission of data, wherein the data transmission occurs via a communications resource, such as a wireless shared-communications channel. Examples of data-transmission requirements include the data periodicity to be maintained, quality-of-service requirements (i.e., related to bandwidth required, maximum error rate, and maximum latency), and so forth. The required bandwidth refers to the data rate, or the channel time, that is required for the traffic stream of data to be transmitted.

The term "traffic stream description," and its inflected forms, is defined as the information that specifies the data-transmission requirements, either explicitly or implicitly. For example, instead of explicitly stating a requirement (e.g., data rate of 1 Mbps, etc.), the traffic stream description might identify the codec, as is known in the art, to be used by a wireless terminal during a call, wherein the particular choice of codec implies a certain bandwidth requirement for the call. A telecommunications terminal that is preparing to communicate data originates the traffic stream description.

The term "call," and its inflected forms, is defined as a communication of user information between two or more telecommunications terminals. Examples of a call are a voice telephone call, an email, a text-based instant message [IM] session, a video conference, etc.

The term "communications resource usage," and its inflected forms, is defined as data that characterizes usage of a communications resource (e.g., percentage of channel time used, etc.) associated with a communications medium, such as a wireless shared-communications channel.

Figure 1:
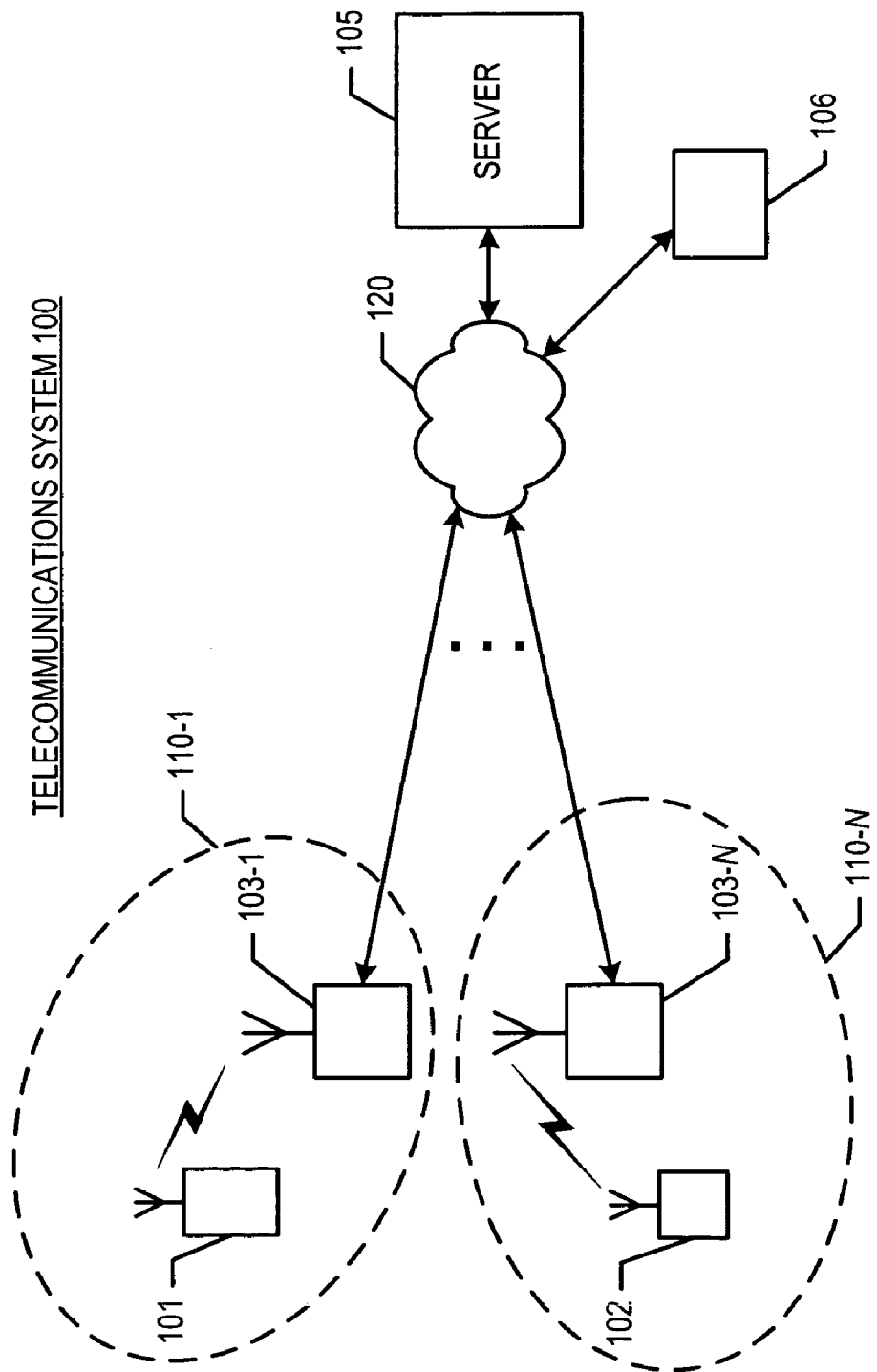
FIG. 1 depicts a diagram of telecommunications system 100 in the prior art.
Figure 2:
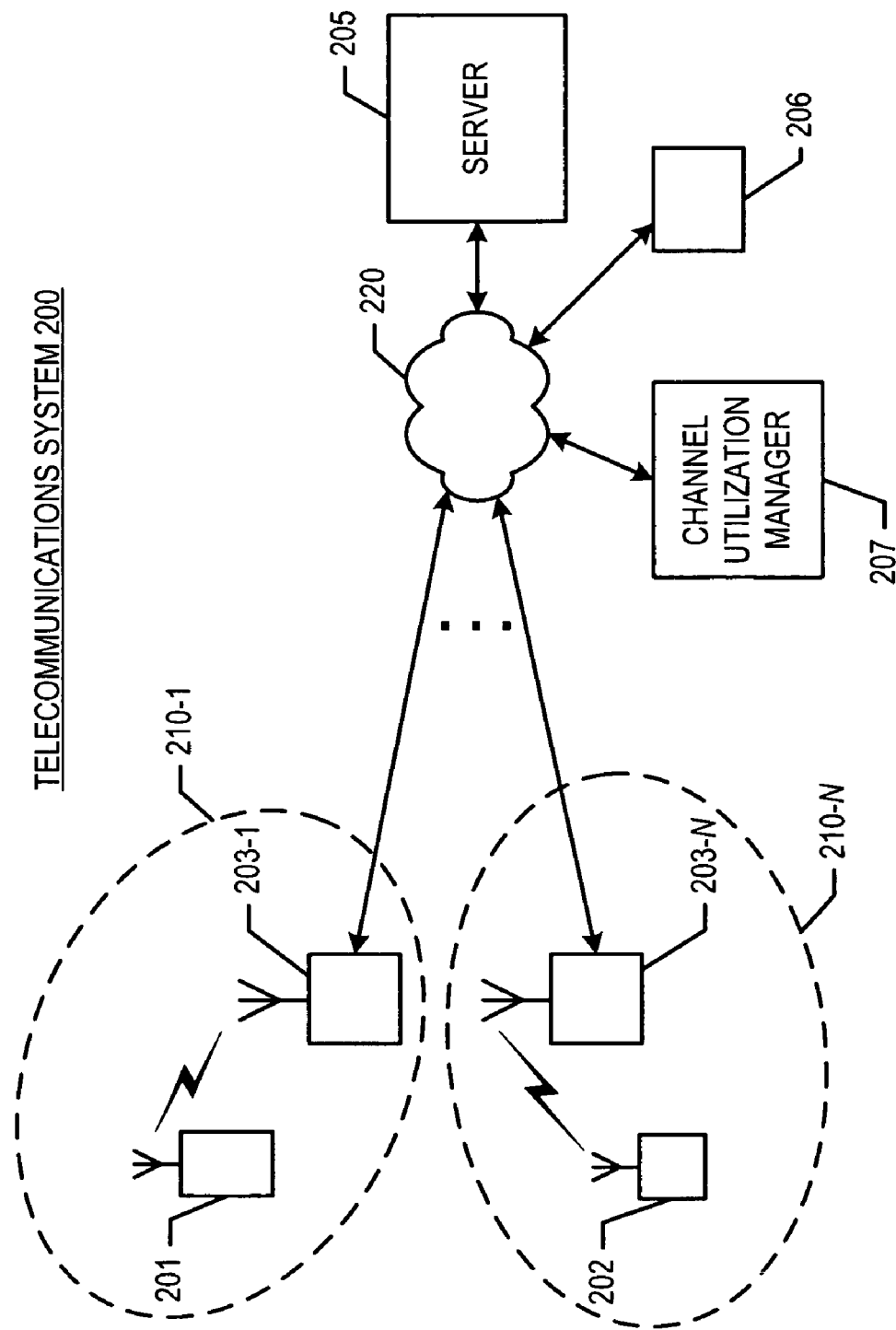
FIG. 2 depicts a diagram of telecommunications system 200 in accordance with the illustrative embodiment of the present invention.

FIG. 2 depicts a diagram of telecommunications system 200 in accordance with the illustrative embodiment of the present invention. Telecommunications system 200 comprises wireless telecommunications terminals 201 and 202; access points 203-1 through 203-N that serve basic service areas 210-1 through 210-N, respectively, wherein N is a positive integer; server 205; telecommunications terminal 206; channel utilization manager 207; and telecommunications network 220, interconnected as shown.

Telecommunications system 200 is capable of Session Initiation Protocol-based (SIP-based) signaling, in accordance with the illustrative embodiment. It will be clear to those who are skilled in the art how to apply the present invention to some alternative embodiments that use other types of call-control signaling, such as H.323, as is known in the art.

Basic service area 210-n, for n=1 through N, is in a telecommunications network that provides shared access of other nodes in telecommunications system 200 to telecommunications terminals such as terminals 201 and 202. As depicted in FIG. 2, area 210-n is in an IEEE 802.11 wireless local area network, in accordance with the illustrative embodiment. As those who are skilled in the art will appreciate, however, area 210-n in some alternative embodiments can be in another type of shared-access network, such as an Ethernet network or cable modem-based network, either wired or wireless. In area 210-n, shared access is provided to one or more wireless telecommunications terminals via a shared-communications channel that is supported by corresponding access point 203-n.

Telecommunications network 220 is a telecommunications network such as the Internet, the Public Switched Telephone Network (PSTN), and so forth. Network 220 comprises or is connected to one or more transmission-related nodes such as gateways, routers, or switches that are used to direct packets from one or more sources to the correct destinations of those packets.

Each of telecommunications terminals 201 and 202, as well as terminal 206, is a communications device such as a local area network telephone, a notebook computer, a personal digital assistant [PDA], a tablet PC, and so forth, and has a contact identifier. Terminals 201 and 202 are assigned fixed Internet Protocol addresses and, as wireless stations, are assigned Internet Protocol addresses from a pre-specified block of addresses. Terminals 201 and 202 communicate, through one or more access points 203-1 through 203-N, with other telecommunications terminals that have connectivity with network 220, such as terminal 206. For example, terminal 201 is associated with access point 203-1 as depicted in FIG. 2 and uses the corresponding shared-communications channel to communicate wirelessly with other devices. In order to communicate, a user at a first telecommunications terminal in system 200, such as terminal 201, places a "call" (e.g., voice call, email, text chat, video, etc.) to a user at a second terminal in system 200, such as terminal 206. Terminals 201 and 202 are also capable of communicating with each other with the attendant call control signaling being routed through one or more nodes connected to network 220, as described below. It will be clear to those skilled in the art how to make and use terminals 201, 202, and 206.

Access point 203-n, wherein n has a value of between 1 and N, inclusive, is an access point as is known in the art that exchanges packets that convey data (e.g., control messages, voice traffic, video streams, etc.) with one or more wireless telecommunications terminals, such as terminals 201 and 202, via its shared-communications channel. Access point 203-n, in well-known fashion, employs a contention-based protocol (e.g., IEEE 802.11 DCF, etc.) for ensuring that a wireless terminal or access point can gain exclusive access to the shared-communications channel for an interval of time in order to transmit packets.

Access point 203-n also has to be able to handle traffic streams, each of which comprising a series of packets, that are transmitted to or from wireless terminals via the shared-communications channel. In accordance with the illustrative embodiment, some of access points 203-1 through 203-N are capable of handling the requests from an associated wireless terminal to admit such a traffic stream, while some of access points 203-1 through 203-N are not. In the polled access (i.e., a contention-free access) mode that is part of the IEEE 802.11e set of protocols, as is known in the art, access point 203-n is able to track the utilization of its shared-communications channel. In the distribution access (i.e., a contention-based access) mode, however, access point 203-n is not required to track the channel utilization; furthermore, terminals that use the distribution access mode are not required to request call admission onto the shared-communications channel. Therefore, manager 207 hosts the call admission control functionally to ensure that the utilization of all shared-communications channels in areas 210-1 through 210-N is managed, in accordance with the illustrative embodiment and as described later. In any event, it will be clear to those skilled in the art how to make and use access point 203-n.

Server 205 is a Session Initiation Protocol (SIP) proxy server, as is known in the art. In accordance with the illustrative embodiment of the present invention, server 205 also transmits information to channel utilization manager 207 to determine whether a call should be allowed on a shared-communications channel. How server 205 interacts with other nodes in setting up and managing calls is described below and with respect to FIGS. 4 through 8.

Server 205 is a SIP proxy server in the illustrative embodiment. As those who are skilled in the art will appreciate, in some alternative embodiments, server 205 can be a different type of server such as another type of SIP server or another type of call-control server that uses a different protocol (e.g., H.323, etc.). In any event, it will be clear to those skilled in the art, after reading this specification, how to make and use server 205.

In accordance with the illustrative embodiment, channel utilization manager 207 provides the admission control to handle requests to add traffic streams that utilize the shared-communications channels of access points 203-1 through 203-N. The salient components of manager 207 are described below and with respect to FIG. 3. If, for example, the channel utilization of a particular shared-communications channel exceeds a predetermined level, manager 207 may disallow a new call on that channel.

Manager 207 is able to receive the following information from the specified nodes:
  i. a registration, from access point 203-n;
  ii. a notification that a terminal has associated with access point 203-n;
  iii. a message that contains the physical data rate that is supported by a terminal active in a call, where the message can be sent repeatedly to update the data rate;
  iv. a notification that a terminal has disassociated from access point 203-n;
  v. a measurement of the shared-communications channel quality (e.g., noise, collision rate, frame or bit error rate, etc.), from access point 203-n;
  vi. the bandwidth that is committed through IEEE 802.11e traffic specifications (TSPEC), as are known in the art, to traffic streams that do not involve server 205 (e.g., direct link protocol [DLP] transmissions, etc.);
  vii. a resource reservation request for a particular call, from server 205; and
  viii. a notification of the ending of a particular call, from server 205.

In addition, manager 207 is able to transmit the following information to the specified nodes:
  i. a resource reservation response for a particular call, to server 205; and
  ii. a notification that an existing call is being rejected, to server 205.

How manager 207 interacts with access points 203-1 through 203-N and server 205 in admitting and enabling calls is described below and with respect to FIGS. 4 through 8. It will be clear to those skilled in the art, after reading this specification, how to make and use manager 207.

As depicted in FIG. 2, one SIP proxy server is provisioned with one channel utilization manager and N access points. As those who are skilled in the art will appreciate, however, a different provisioning of server, manager, and access points is possible in system 200. For example, one server might be provisioned with two channel utilization managers, wherein each manager is provisioned with N/2 access points. Call-related information (such as in a call-setup traffic specification, to be described later) is transferred from a first channel utilization manager to a second manager when a call hands over from one access point served by the first manager to another access point served by the second manager.

Figure 3:
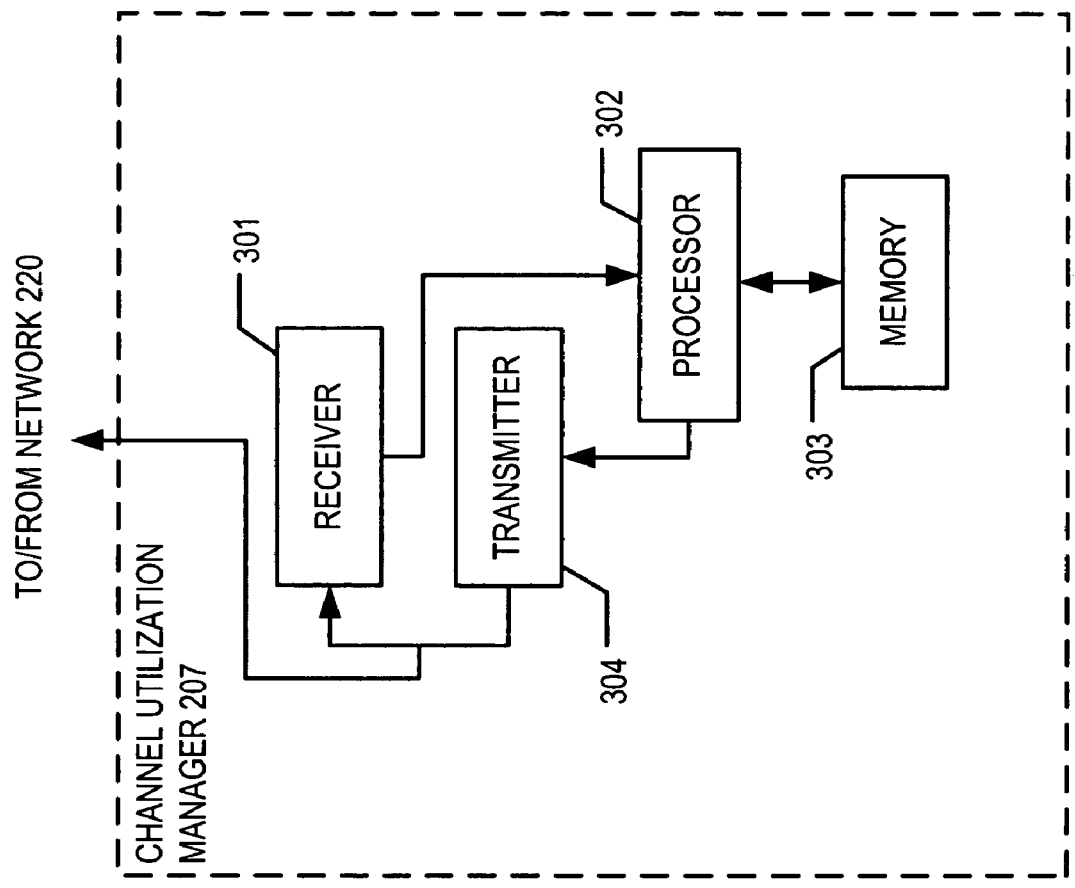
FIG. 3 depicts the salient components of channel utilization manager 207 in accordance with the illustrative embodiment of the present invention.

FIG. 3 depicts the salient components of channel utilization manager 207 in accordance with the illustrative embodiment of the present invention. Manager 207 comprises receiver 301, processor 302, memory 303, and transmitter 304, interconnected as shown.

Receiver 301 receives signals from other nodes via network 220 and forwards the information encoded in the signals to processor 302, in well-known fashion. It will be clear to those skilled in the art, after reading this specification, how to make and use receiver 301.

Processor 302 is a general-purpose processor that is capable of receiving information from receiver 301, executing instructions stored in memory 303, reading data from and writing data into memory 303, executing the tasks described below and with respect to FIGS. 4 through 8, and transmitting information to transmitter 304. In some alternative embodiments of the present invention, processor 302 might be a special-purpose processor. In either case, it will be clear to those skilled in the art, after reading this specification, how to make and use processor 302.

Memory 303 stores the instructions and data used by processor 302. Memory 303 might be any combination of random-access memory (RAM), flash memory, disk drive memory, and so forth. It will be clear to those skilled in the art, after reading this specification, how to make and use memory 303.

Transmitter 304 receives information from processor 302 and transmits signals that encode this information to other nodes via. network 220, in well-known fashion. It will be clear to those skilled in the art, after reading this specification, how to make and use transmitter 304.

Figure 4:
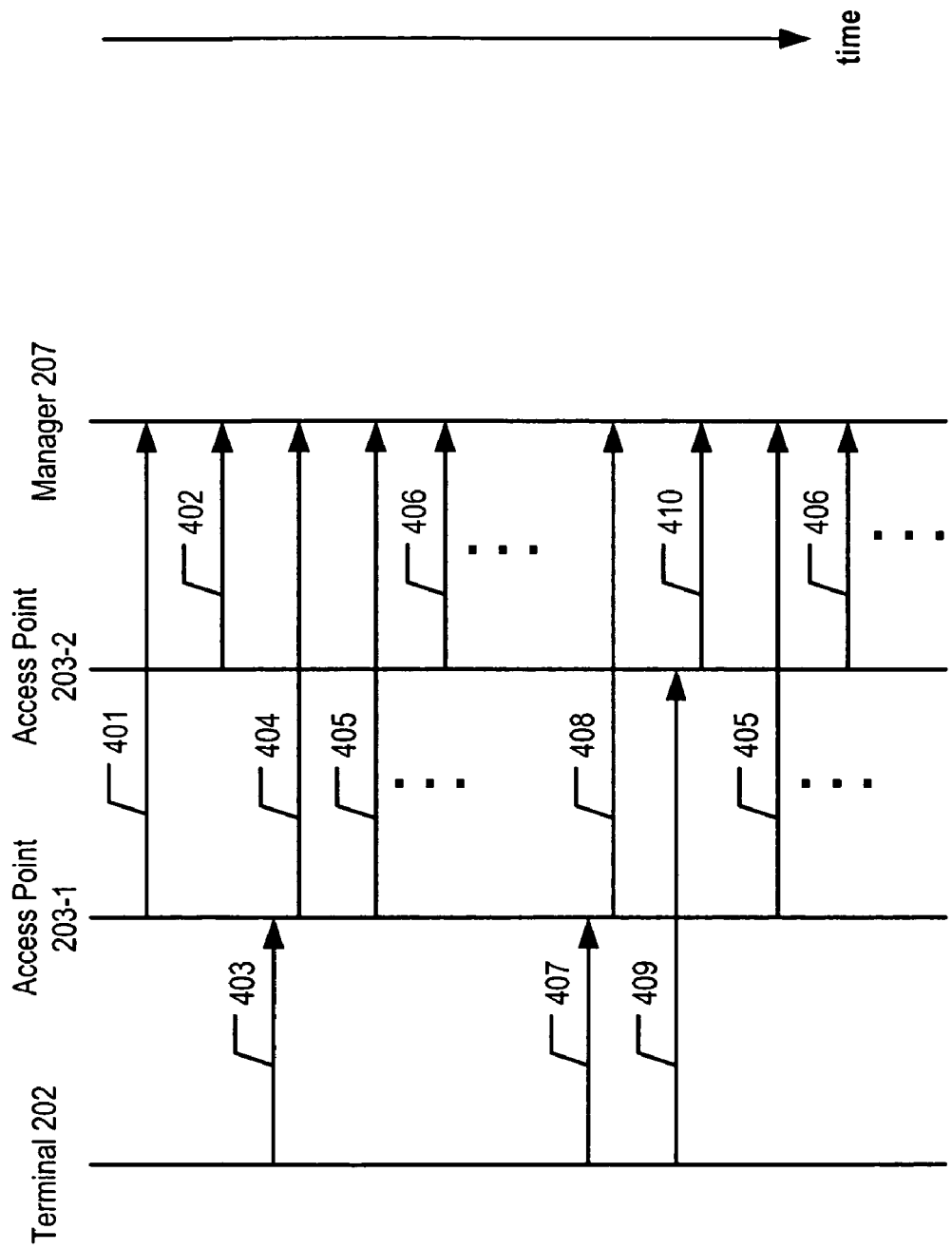
FIG. 4 depicts an illustrative series of messages that are exchanged between (i) access points 203-1 and 203-2 and (ii) channel utilization manager 207 during the course of managing terminal 202.

FIG. 4 depicts an illustrative series of messages that are exchanged between (i) access points 203-1 and 203-2 and (ii) channel utilization manager 207 during the course of managing terminal 202, in accordance with the illustrative embodiment of the present invention. As those who are skilled in the art will appreciate, some of the messages that are depicted in FIG. 4 can be transmitted or received in a different order than that depicted.

When an access point initializes, it registers with channel utilization manager 207. As depicted in FIG. 4, access point 203-1 transmits registration message 401 to manager 207, and access point 203-2 transmits registration message 402 to manager 207. The registration message from each access point identifies the capability of the physical layer of the shared-communications channel (e.g., IEEE 802.11a-capable, IEEE 802.11g-capable, etc.) to manager 207, which uses the information to determine the physical layer data rate of the particular shared-communications channel. The registration message also reports environmental parameters that affect capacity, including background noise, transmission attempt failure rate, and so forth; the access point may also transmit a registration message when an environmental parameter, such as background noise, changes. Furthermore, if there are IEEE 802.11e traffic specifications that are admitted by the access point without server 205 being involved, the access point (e.g., access point 203-1, etc.) reports to manager 207 the total bandwidth committed to all the terminals in the corresponding basic service area (e.g., area 210-1, etc.).

When a telecommunications terminal associates with an access point, the access point updates manager 207. As depicted in FIG. 4, terminal 202 for example associates with access point 203-1 by transmitting message 403; access point 203-1 indicates this to manager 207 by transmitting message 404, which comprises the Internet Protocol address and physical layer capabilities of terminal 202, including the terminal's physical layer data rate. The access point may also transmit message 403 when the maximum physical layer data rate of the terminal changes, which may occur when, for example, the terminal moves closer to or away from the access point.

Meanwhile, in some embodiments, access point 203-1 continually updates manager 207 on the quality of its shared-communications channel or committed bandwidth, or both, by transmitting message 405 either periodically or sporadically. Similarly, in some embodiments, access point 203-2 continually updates manager 207 on the quality of its shared-communications channel or committed bandwidth, or both, by transmitting message 406 either periodically or sporadically.

As depicted in FIG. 4, at some point terminal 202 disassociates with access point 203-1 via message 407 and associates with access point 203-2 via message 409, in well-known fashion. Accordingly, access point 203-1 transmits message 408 in response to disassociation message 407 and access point 203-2 transmits message 410 in response to association message 409. Alternatively, a terminal may dissociate from an access point without sending a message; in this case, inactivity, as determined by the access point, triggers disassociation and causes the access point to update manager 207 about the disassociation.

Message 410 comprises the Internet Protocol address and physical layer capabilities of terminal 202. Terminal 202 maintains the same Internet Protocol address when it associates with the new access point, in this case access point 203-2.

Figure 5:
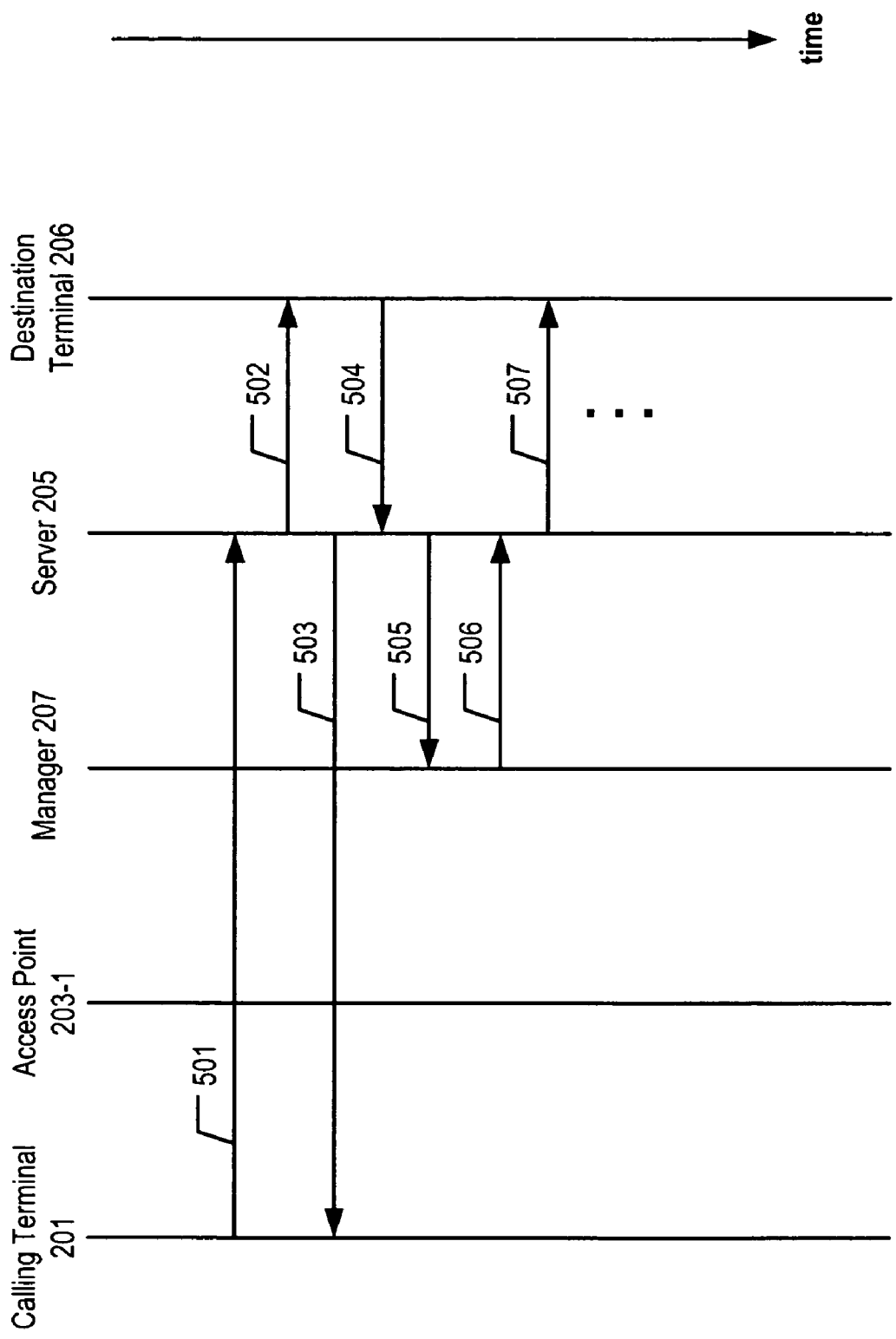
FIG. 5 depicts a diagram of the message flow associated with an example of the user of telecommunications terminal 201 calling a user at telecommunications terminal 206, wherein channel utilization manager 207 accepts the call.
Figure 6:
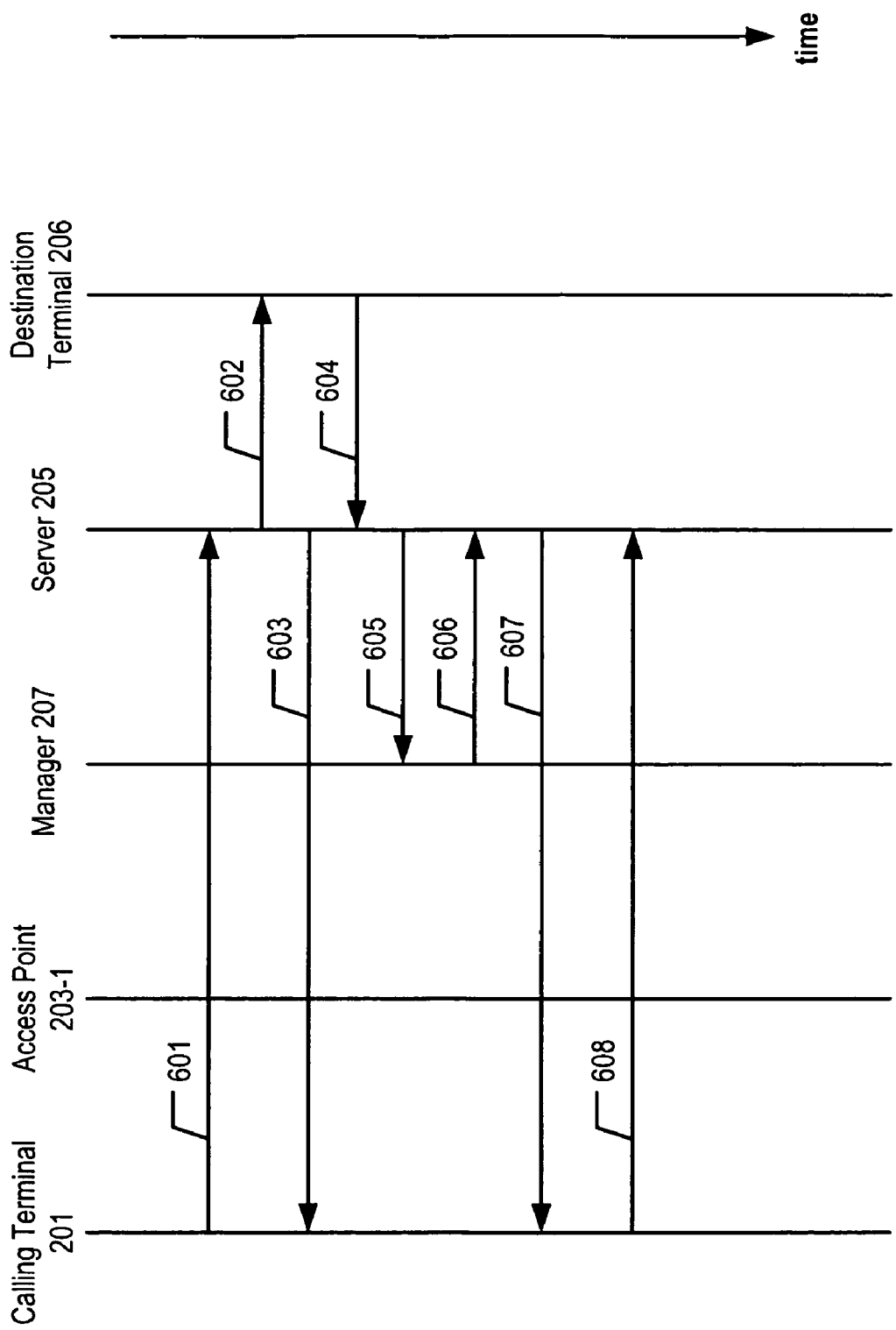
FIG. 6 depicts a diagram of the message flow associated with an example of the user of telecommunications terminal 201 calling a user at telecommunications terminal 206, wherein channel utilization manager 207 rejects the call.
Figure 7:
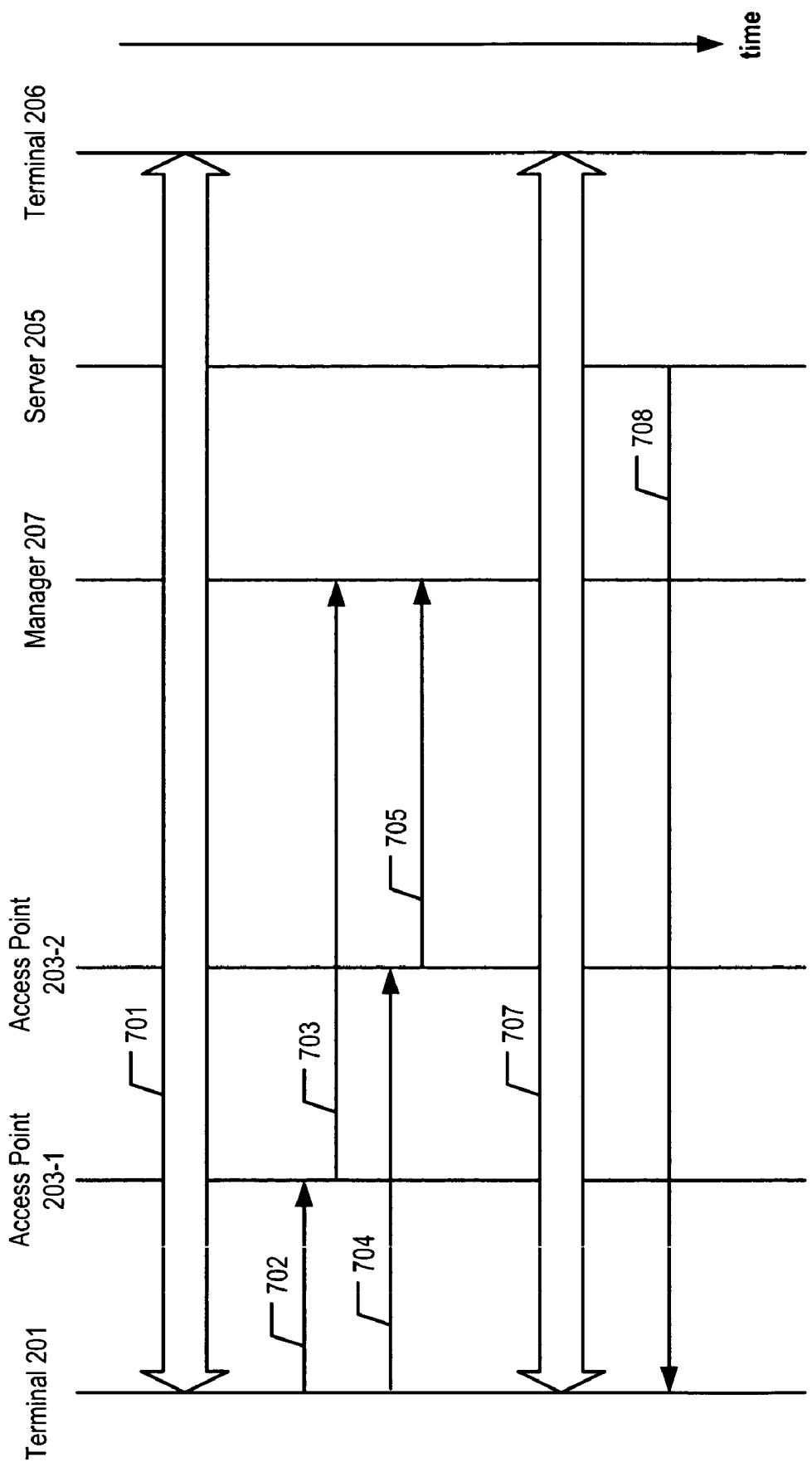
FIG. 7 depicts a diagram of the message flow associated with an example of telecommunications terminal 201 exchanging call traffic packets with telecommunications terminal 206, wherein terminal 201 moves from access point 203-1's coverage area to access point 203-2's coverage area.

FIGS. 5 through 7 depict message flow diagrams that are related to handling calls between two telecommunications terminals, in which at least one of the terminals uses a shared-communications channel. In accordance with the illustrative embodiment, some or all of the message flow described above and with respect to FIG. 4 may occur concurrently with the message flow depicted in each of FIGS. 5 through 7; for example, channel utilization manager 207 continually receives messages 405 and 406 that report channel quality from access points 203-1 and 203-2, respectively. Manager 207 might also repeatedly receive a message such as message 404, which can report a terminal's physical layer data rate as received by the access point. As those who are skilled in the art will appreciate, some of the messages that appear in each of FIGS. 5 through 7 can be transmitted or received in a different order than the order depicted.

FIG. 5 depicts a diagram of the message flow associated with an example of the user of telecommunications terminal 201 calling a user at telecommunications terminal 206, in accordance with the illustrative embodiment of the present invention, wherein channel utilization manager 207 accepts the call. Terminal 201's user initiates the message flow by entering a command into terminal 201 to place a call to the other user. Terminal 201 transmits message 501, a SIP INVITE message, to server 205. Message 501 comprises (i) a traffic stream description (e.g., a SIP Real-Time Protocol [RTP] payload type, etc.) that specifies the nature of the call and (ii) the user identifier of the person being called. The traffic stream description also includes one or more data-transmission requirements (e.g., required bandwidth, etc.), as part of a media description for the candidate call.

Server 205 determines which terminal is currently associated with the user identifier of the called user (i.e., the "destination terminal"), and transmits message 502, a SIP OPTIONS message, to the destination terminal, in this case terminal 206, to determine the capabilities of that terminal (e.g., whether the destination terminal supports certain types of media, etc.). Server 205 also determines, in well-known fashion, from the calling terminal's Internet Protocol address that the server should remain on the signaling path that was used to receive the SIP INVITE message. Telecommunications system 200 uses the Record-Route header mechanism, as is well-known in the art, to indicate to server 205 that it will be a "call-stateful" proxy for the call. Accordingly, server 205 remains on the signaling path for at least part of the call, if admitted, in accordance with the illustrative embodiment.

Server 205 also transmits response message 503, a SIP TRYING message, back to wireless terminal 201, indicating that the server is attempting to set up the call.

Destination terminal 206 transmits message 504 to server 205 (e.g., a SIP OK message, etc.) in response to message 502.

Server 205 determines that terminal 201 is wireless and is served by an access point that is managed by channel utilization manager 207, and that manager 207 has to therefore be notified of the candidate call. Server 205 determines terminal 201's access method by checking terminal 201's Internet Protocol address against a list of addresses that correspond to terminals associated with wireless local area networks. As those who are skilled in the art will appreciate, server 205 can determine terminal 201's access method through other means in some alternative embodiments.

Subsequent to determining terminal 201's call dependency on manager 207, server 205 transmits message 505 to manager 207. Message 505 is a call-setup traffic specification, which comprises an admission request with a description of the traffic stream with one or more data-transmission requirements (e.g., periodicity, required data rate, etc.).

Channel utilization manager 207 receives message 505 from server 205 and stores the received call-setup traffic specification in a newly created record associated with the call. Manager 207 then determines whether it should admit the call on the shared-communications channel, in accordance with the illustrative embodiment of the present invention, as described below and with respect to FIG. 8.

In the illustrative message flow depicted in FIG. 5, manager 207 determines that the candidate call is to be admitted. As a result, manager 207 (i) notes the additional call and the accompanying utilization in its database (i.e., sets or otherwise changes the value of a flag that signifies call admittance), and (ii) transmits acceptance message 506 to server 205, indicating that the candidate call is admitted.

Server 205 then transmits message 507, a SIP INVITE message, to destination terminal 206. Subsequently, server 205 continues to set up the call between terminals 201 and 206 in well-known fashion.

FIG. 6 depicts a diagram of the message flow associated with an example of the user of telecommunications terminal 201 calling a user at telecommunications terminal 206, in accordance with the illustrative embodiment of the present invention, wherein channel utilization manager 207 rejects the call. Messages 601 through 605 and the events associated with those messages are the same as messages 501 through 505 and their associated events, described earlier and with respect to FIG. 5.

In this message flow, manager 207 determines that the call is not to be admitted (in the manner that is described with respect to FIG. 8) and, as a result, transmits message 606 to server 205, indicating that it has rejected the call.

Consequently, server 205 then transmits message 607, a SIP error message (e.g., a "not acceptable here" message, etc.), to calling terminal 201, which acknowledges the message by transmitting message 608, a SIP ACK message.

FIG. 7 depicts a diagram of the message flow associated with an example of telecommunications terminal 201 exchanging call traffic packets with telecommunications terminal 206, in accordance with the illustrative embodiment of the present invention, wherein terminal 201 moves from access point 203-i's coverage area to access point 203-2's coverage area. In other words, system 200 performs a "handover" of terminal 201. In real-time protocol (RTP) stream 701, terminals 201 and 206 exchange traffic packets in well-known fashion.

At some point during the call traffic exchange, terminal 201 disassociates with access point 203-1 via message 702 and associates with access point 203-2 via message 704, in well-known fashion. Accordingly, access point 203-1 transmits message 703 in response to message 702; access point 203-2 transmits message 705 in response to message 704, in which message 705 comprises the Internet Protocol address and physical layer capabilities of terminal 201.

Manager 207 determines whether to admit the call (in the manner that is described with respect to FIG. 8), now that terminal 201 is associated with access point 203-2 and is using a new shared-communications channel. In accordance with the illustrative embodiment, manager 207 places a greater emphasis on admitting handover-elated calls on a shared-communications channel than new calls. In order to effectively reserve channel resources for handover-related calls, manager 207 rejects new calls at a lower utilization level than that of handover calls. Nevertheless, if the utilization level exceeds the level at which handover calls are to be rejected, manager 207 transmits a message to server 205 that indicates to the server that the existing call is unacceptable and that it should drop the call.

In some alternative embodiments, handover-related calls are admitted unconditionally or are admitted if they are of a specified priority level (e.g., E911 calls, etc.). If overall quality-of-service on the utilized shared-communications channel deteriorates, manager 207 can drop other calls or further lower the utilization level at which new calls are rejected.

In this scenario, however, manager 207 accepts terminal 201 on the new shared-communications channel. With terminal 201 now associated with access point 203-2 and with manager 207 having accepted the call on the new channel, terminals 201 and 206 continue to exchange traffic packets in well-known fashion, as depicted by real-time protocol (RTP) stream 707.

As those who are skilled in the art will appreciate, terminal 201 can continue to move into coverage areas served by other access points (e.g., access point 203-3, etc.) and similar call admission control will occur between the "old" access point, the "new" access point, and manager 207, in accordance with the illustrative embodiment of the present invention.

Figure 8:
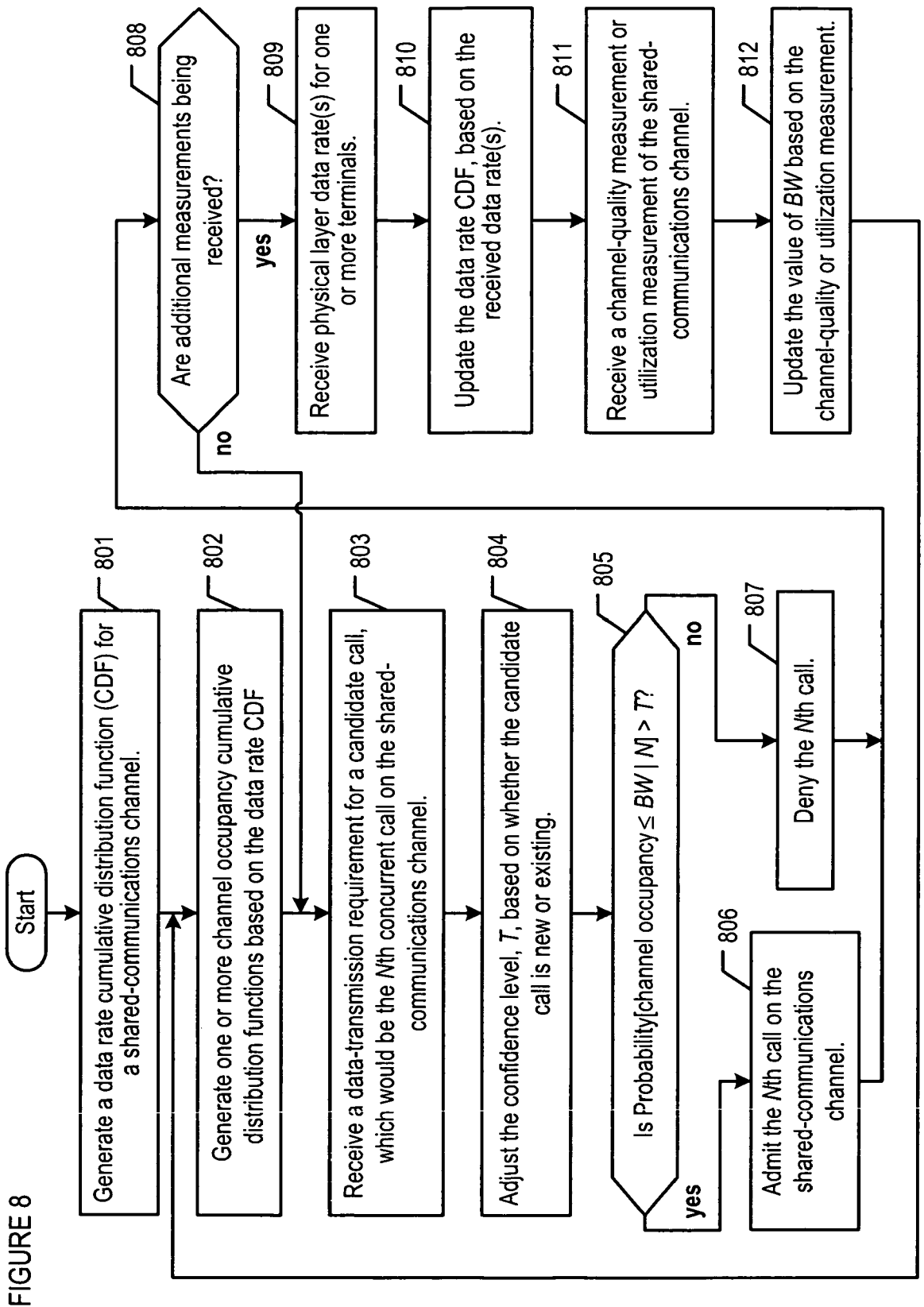
FIG. 8 depicts a flowchart of the salient tasks associated with channel utilization manager 207 determining whether to admit a call, in accordance with the illustrative embodiment of the present invention.

FIG. 8 depicts a flowchart of the salient tasks associated with channel utilization manager 207 determining whether to admit a call onto the shared-communications channel served by access point 203-1, in accordance with the illustrative embodiment of the present invention. In the example provided, terminal 201 is involved in the call that manager 207 is considering. As those who are skilled in the art will appreciate, some of the tasks that appear in FIG. 8 can be executed in a different order than the order depicted.

General Explanation—As terminal 201 moves closer to or away from access point 203-1, the terminal can change the actual data rate that it uses to communicate; consequently, the actual bandwidth that is utilized by the corresponding call changes. It is problematic in the prior art to consider the variation in channel occupancy that is due to the movement of a telecommunications terminal with respect to its associated access point. This is because the actual variation in the terminal's movement during a call as a function of time typically cannot be predicted. Yet it is important, as part of determining whether to admit a call on a shared-communications channel, to account for the channel occupancy of the terminal in relation to the available bandwidth of the channel, especially considering that many other terminals might already be using the shared-communications channel.

In accordance with the illustrative embodiment of the present invention, channel utilization manager 207 accounts for the probabilistic nature of the call admission decision by using a pre-determined, statistically justified value to represent the channel occupancy. The "per-call" channel occupancy value is determined by a number of factors, including the shared-communications channel data rate. The per-call channel occupancy for a given codec and shared-communications channel data rate is determined through empirical observation or through simulation models, and is used in the manner described below.

In accordance with the illustrative embodiment, channel occupancy is incorporated into one or more cumulative distribution functions (CDF) of channel occupancy. For a given shared-communications channel, each channel occupancy CDF represents the probability of a given channel occupancy level, while taking into account the number of calls (e.g., 1 call, 2 calls, etc.) and other parameters that include the variability in the maximum data rates of the terminals present. The probability distributions for 1 call, 2 calls, 3 calls, and so forth may be calculated either ahead of time or while processing the call admission decision to account for, while not being limited to, the following parameters:

i. each shared-communications channel physical layer rate supported (e.g., 54 Mbps, 11 Mbps, etc.);
  ii. the probability that a given terminal will be served at a given physical layer rate;
  iii. each quality-of-service criterion to be considered (e.g., 10 ms maximum delay, 50 ms maximum delay, etc.); and
  iv. the data-transmission requirements for the call, including the codec to be used.

When channel utilization manager 207 considers admitting a candidate call and that call would be the Nth concurrent call on the shared-communications channel, the manager evaluates the N-call CDF to determine whether the resulting channel occupancy would be less than or equal to an adjustable bandwidth threshold (e.g., 80 percent of the channel's limit, etc.), at a probability that exceeds the desired confidence level (e.g., 98%, etc.). If this admission criterion is met, channel utilization manager 207 admits the call, in accordance with the illustrative embodiment of the present invention.

In accordance with the illustrative embodiment, each channel-occupancy CDF of a shared-communications channel is generated from a CDF of the terminals' data rates on that channel. A probability distribution of the terminals' data rates is generated from analytical models or from input received from an access point, or both. Estimating the data rate probability distribution provides an efficient way to derive a channel occupancy probability distribution for a variety of combinations of codec type and number of calls.

In some other embodiments, channel utilization manager 207 is able to refine the channel occupancy values during the processing of live calls on a shared-communications channel. The access point that supports the channel (e.g., access point 203-1, etc.) regularly reports to manager 207 the data rate supported by a terminal, for multiple terminals. An empirically derived probability distribution, as such, reflects both the propagation environment and the spatial distribution of the terminals that are involved in calls in the basic service area. Thus, the probability distribution and call admission criterion are tailored to the particular basic service area monitored and supported by the access point.

Described Tasks—At task 801, manager 207 generates an initial CDF of telecommunications terminal data rates. At the start of the process, manager 207 receives the maximum physical layer rate of the shared-communications channel (e.g., via message 401, etc.) from the corresponding access point, such as access point 203-1. In some embodiments, manager 207 then uses known environmental conditions such as the applicable path loss and background noise level to estimate maximum data rates available at various distances from the access point, given the received maximum data rate of the channel. In this analytical model, manager 207 proceeds to estimate a hypothetical terminal's probability of being at various places in the coverage area of the shared-communications channel and, therefore, the probability of operating at various data rates. From this data, manager 207 then generates a CDF in well-known fashion.

As those who are skilled in the art will appreciate, in some embodiments the data rate CDF is generated without involving manager 207, while in some other embodiments some or all of the values are generated by manager 207. For example, manager 207, in some embodiments, might initially operate in a data-gathering mode in which the manager does not process calls, but gathers information on the terminals and shared-communications channels via one or more access points. Manager 207, in some embodiments, might also regenerate some or all of the values, as described below and with respect to tasks 802 through 812, based on receiving updated information via the access points.

Figure 9:
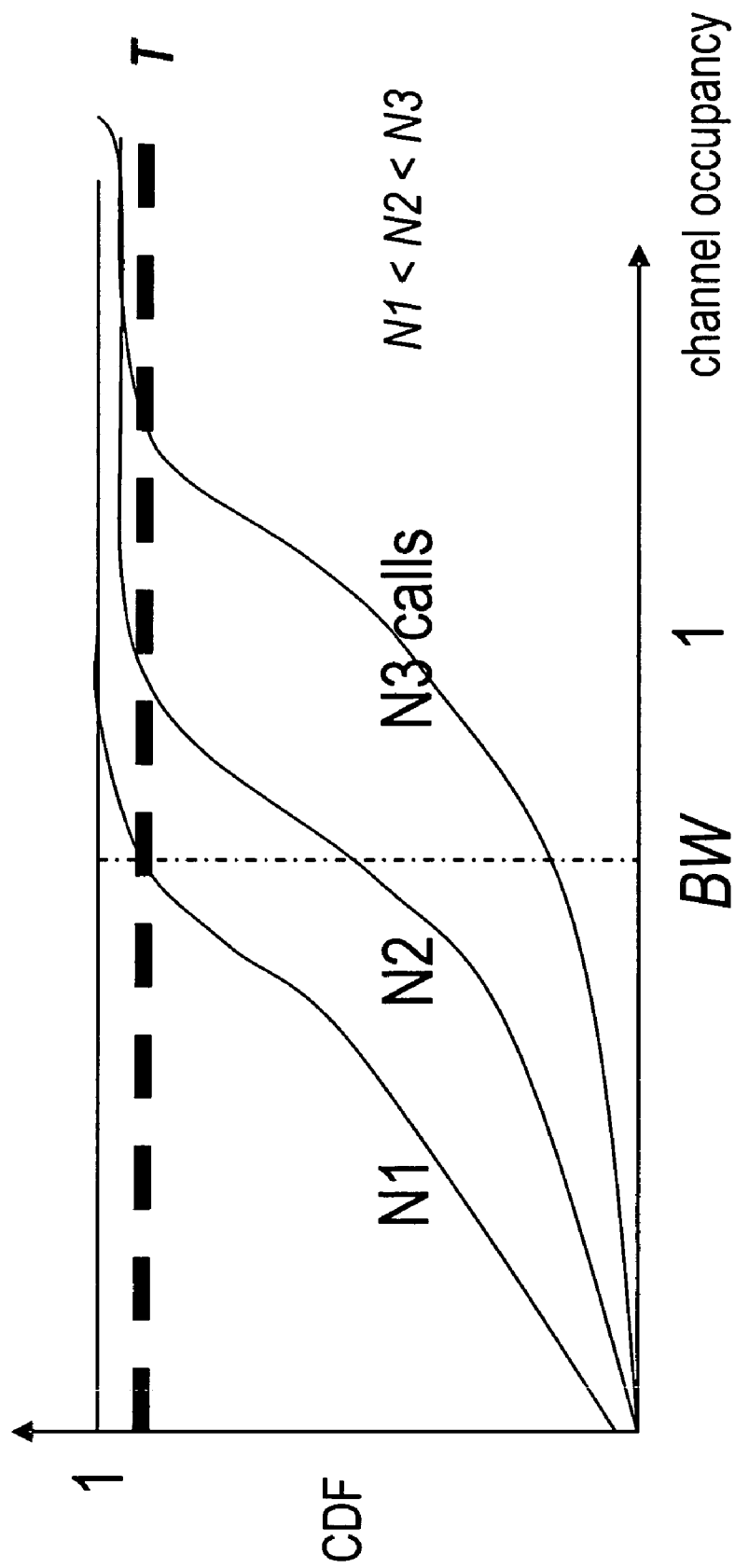
FIG. 9 depicts a set of cumulative distribution functions of channel occupancy for varying numbers of calls.

At task 802, manager 207 generates one or more channel occupancy CDFs, in accordance with the illustrative embodiment, wherein the channel occupancy CDFs are based on the data rate CDF generated at task 801. An illustrative set of channel occupancy CDFs is depicted in FIG. 9, in which the CDFs are graphically represented. As explained earlier, each of the channel occupancy CDFs accounts for a different number of calls, as well as different mixes of other parameters, such as codec rates. In a simplified scenario, however, in which the same data-transmission requirements apply for all calls (e.g., the same codec rate, etc.), it is possible to have exactly one channel occupancy CDF per each different value in the number of calls to be considered.

As those who are skilled in the art will appreciate, in some embodiments the channel occupancy CDFs are generated without involving manager 207, while in some other embodiments some or all of the values are generated by manager 207. It should be obvious to those skilled in the art that when making a call admission decision, given that a mix of different codecs is used by the N calls, it is not necessary to generate the entire CDF of channel occupancy by N calls. It is sufficient to compute the probability that channel occupancy will not exceed the specified threshold level. If that probability is greater than or equal to the desired confidence level, the $N^{th}$ call is admitted.

At task 803, manager 207 receives a data-transmission requirement for a candidate call. The requirement, for example, can be a specified codec type and rate. Manager 207 might have also received an indication (e.g., via message 404, etc.) that terminal 201 is monitoring the shared-communications channel, which for example can occur when the terminal associates with the corresponding access point.

At task 804, manager 207 adjusts a confidence level, T, that will be used in the call admission process. In some embodiments, the value of T is based on whether the candidate call is a new call or a call being handed over from another shared-communications channel (i.e., an existing call). In some alternative embodiments, the value of T is unaffected by the type of call being considered. In some other alternative embodiments, the value of the parameter BW is based on whether the candidate call is a new or existing call.

At task 805, manager 207 evaluates the following inequality:

Probability [channel occupancy>BW|N, $QoS_{MIN}$]>T, where BW is the fraction (e.g., 0.8, etc.) that can be allocated to calls of the total shared-communications channel, N is the number of calls that would be concurrently using the shared-communications channel, $QoS_{MIN}$ refers to the minimum quality of service that is allowed throughout all calls present (e.g., delay less than 5 milliseconds, etc.), and T is the confidence level. The probability distribution used is the channel occupancy CDF for N number of calls. If the inequality is true, then the call can be admitted and task execution proceeds to task 806. If the inequality is false, then the call cannot be admitted and task execution proceeds to task 807. As those who are skilled in the art will appreciate, a different inequality or criteria can be used to assess whether a candidate call should be admitted or not.

At task 806, manager 207 admits the call and notifies other data-processing systems accordingly. Task execution then proceeds to task 808.

At task 807, manager 207 denies the call and notifies other data-processing systems accordingly.

At task 808, manager 207 checks if there are any shared-communications channel-related parameters that are being received. If there are, task execution proceeds to task 809. If not, task execution proceeds to task 803.

At task 809, manager 207 receives a terminal's current maximum, physical-layer data rate via access point 203-1.

At task 810, manager 207 updates the data rate CDF based on the data rate received at task 809 (and based on other data rates received for other terminals served by access point 203-1). Over time, the mobility patterns of terminals in the actual operating environment influence the data rate CDF that was initially generated based on assumptions. In this way, the data rate CDF is updated to reflect the operating environment of the basic service area supported by access point 203-1.

At task 811, manager 207 receives, from access point 203-1, a channel-quality measurement (e.g., background noise, collision rate, etc.) of the shared-communications channel or a channel utilization measurement. For example, manager 207 might receive the information from access point 203-1 via message 405. The channel quality measurements are described above and with respect to FIG. 4.

At task 812, manager 207 optionally updates the BW parameter based on the parameters received at task 811. In this way, manager 207 considers the presence channel impairments (e.g., noise, etc.) and other traffic on the shared-communications channel, and their effects on the actual usable bandwidth of the channel. Task execution then proceeds to task 802. Manager 207, in some other embodiments, may also adjust the usable bandwidth by considering the bandwidth that is committed through IEEE 802.11e traffic specifications to traffic streams that do not involve server 205.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving, at a utilization management system, a first data-transmission requirement for a candidate call that involves a first telecommunications terminal that is operable within a coverage area of a shared-communications channel;
   generating, at the utilization management system, a first cumulative distribution function that is based on (i) N calls concurrently using the shared-communications channel, wherein the candidate call is one of the N calls, (ii) the first data-transmission requirement applying possibly to more of said N calls than just the candidate call, wherein N is a positive integer, and (iii) a path loss that describes the coverage area; and
   determining, at the utilization management system, whether to admit the candidate call, based on the first cumulative distribution function;
   wherein the first cumulative distribution function is of channel occupancy of the shared-communications channel; and
   wherein the first cumulative distribution function is based on a second cumulative distribution function that is of a plurality of physical layer data rates used by one or more telecommunications terminals.

2. The method of claim 1 further comprising receiving the plurality of physical layer data rates from an access point that supports the shared-communications channel.

3. A method comprising:
   receiving, at a utilization management system:
   (i) a first physical layer data rate of a first telecommunications terminal that is involved in an existing call on a shared-communications channel, and
   (ii) a first data-transmission requirement for a new call that involves a second telecommunications terminal that is operable within a coverage area of the shared-communications channel;
   generating, at the utilization management system, a first cumulative distribution function from a second cumulative distribution that is based on the first physical layer data rate, and wherein the first cumulative distribution function is based on (i) N calls concurrently using the shared-communications channel, (ii) the first data-transmission requirement applying to one or more of the N calls, wherein N is a positive integer, and (iii) a path loss that describes the coverage area; and
   determining, at the utilization management system, whether to admit the new call on the shared-communications channel, based on the first cumulative distribution function, wherein the new call is one of the N calls.

4. The method of claim 3 wherein the first cumulative distribution function is of channel occupancy of the shared-communications channel.

5. The method of claim 4 wherein determining whether to admit the new call comprises evaluating a probability against a threshold value that the channel occupancy of the shared-communications channel, as a result of admitting the new call, will not exceed available capacity, wherein the shared-communications channel is already carrying (N−1) calls, wherein the probability is conditional on the value of N.

6. The method of claim 5 wherein the probability is also conditional on a quality of service metric being satisfactory.

7. The method of claim 3 wherein the first data-transmission requirement specifies a first codec to be used for the new call by the second telecommunications terminal.

8. The method of claim 7 wherein the first cumulative distribution function is also based on (iii) a second data-transmission requirement applying to one or more of the N calls, wherein the second data-transmission requirement specifies a second codec.

* * * * *